United States Patent
Irinouchi et al.

(10) Patent No.: US 7,756,409 B2
(45) Date of Patent: Jul. 13, 2010

(54) IMAGE PICKUP DEVICE AND IMAGE PICKUP METHOD

(75) Inventors: Akira Irinouchi, Yokohama (JP); Haruhiko Miyao, Mito (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 11/370,505

(22) Filed: Mar. 7, 2006

(65) Prior Publication Data

US 2007/0058966 A1    Mar. 15, 2007

(30) Foreign Application Priority Data

Sep. 14, 2005    (JP)    ............................. 2005-266219

(51) Int. Cl.
 G03B 17/00    (2006.01)
 G03B 7/083    (2006.01)
 G03B 7/093    (2006.01)
 G03B 9/08     (2006.01)
 H04N 5/228    (2006.01)

(52) U.S. Cl. ..................... 396/153; 396/53; 396/169; 348/208.2; 348/208.12; 348/208.14

(58) Field of Classification Search ................. 396/153, 396/52–55, 169; 348/208.99, 208.1, 208.2, 348/208.3, 208.4, 208.5, 208.11, 208.14, 348/208.12

See application file for complete search history.

(56) References Cited

U.S. PATENT DOCUMENTS 5,237,365 A * 8/1993 Miyazawa ................... 396/49
2004/0090532 A1* 5/2004 Imada ................... 348/208.16

FOREIGN PATENT DOCUMENTS

JP    03-175885    7/1991
JP    06-130454    5/1994

* cited by examiner

*Primary Examiner*—Rochelle-Ann J Blackman
(74) *Attorney, Agent, or Firm*—Townsend and Townsend and Crew LLP

(57) ABSTRACT

An image pickup device and image pickup method are disclosed, wherein an image is picked up by changing the shutter speed in accordance with the illuminance of an object in the case where the rate at which the object moves in the whole image is smaller than a predetermined value, and an image is picked up without changing the shutter speed regardless of the illuminance of the object in the case where the rate at which the object moves in the whole image is not smaller than the predetermined value.

5 Claims, 7 Drawing Sheets

FIRST PERSON  SECOND PERSON

PANNING DIRECTION

301 VIDEO CAMERA

PERSON MOTION MODE

FIRST MOTION  SECOND MOTION  THIRD MOTION  FOURTH MOTION

SHUTTER SPEED 1/60  FIRST PERSON (IN SUNNY PLACE)

TIME

SECOND PERSON (IN SHADE)

1/30

TIME

FIRST PERSON (IN SUNNY PLACE)  SECOND PERSON (IN SHADE)

TIME t

FIRST PERSON (IN SUNNY PLACE)  SECOND PERSON (IN SHADE)

TIME t

IMAGE PICKUP DEVICE AND IMAGE PICKUP METHOD

INCORPORATION BY REFERENCE

The present application claims priority from Japanese application JP2005-266219 filed on Sep. 14, 2005, the content of which is hereby incorporated by reference into this application.

BACKGROUND OF THE INVENTION

1. Field of the Invention

This invention relates to an image pickup device capable of controlling the shutter speed.

2. Description of the Related Art

JP-A-3-175885 contains the description that "Normally in a video camera using a CCD, with the entrance of the light from an object into the CCD, the optical charge corresponding to the strength of the light at the particular portion is generated in a photodiode, which after being accumulated for one field period (1/60 second), is output as a signal in the next field through a vertical transfer CCD and a horizontal transfer CCD. Specifically, this is equivalent to triggering the shutter in 1/60 second. In the case where an image is picked up in a dark place, however, a sufficient signal level cannot be acquired by sending the video signal for each one field period, and therefore a video camera having mounted thereon what is called the slow shutter is provided in which the vertical transfer gate pulse stops being sent out for the period of several fields into a pulse of several field periods to increase the signal level".

SUMMARY OF THE INVENTION

As disclosed in JP-A-3-175885, in the case where a standard TV signal is formed from an object by picking up an image thereof in a video camera constituting an image pickup device, the exposure time of the image pickup element built in the video camera is set to substantially the same duration as one field, i.e. the period of the vertical sync signal of the standard TV signal. Nevertheless, it may be desired to lengthen or shorten the exposure time from the one field period for appropriate exposure adjustment.

In order to meet this requirement, the image pickup element such as the CCD utilizes the technique of the electronic shutter to attain the optimum light quantity of the incident light. In the electronic shutter, the timing of drawing the charge is electrically controlled in accordance with the light quantity from the image pickup element. In this way, the time from the resetting to the drawing of the charge is controlled to an optimum light quantity. The time from the resetting to the drawing of the charge corresponds to the electronic shutter speed. The currently available techniques include what is called the slow shutter as disclosed in JP-A-3-175885 in which the exposure time of the image pickup element is lengthened to more than one field period, and what is called the high-speed electronic shutter in which the exposure time of the image pickup element is shortened to less than one field period by discarding, for a predetermined length of time, the charge of a photoelectric sensor during the exposure time of the image pickup element. In recent years, the CCD has been reduced in size with the camera size to such a degree that the light receiving area of the photodiode per pixel is reduced for a lower sensitivity, often resulting in the shortage of light quantity. As a measure against this inconvenience, a low-speed shutter has come to be used unavoidably.

The electronic shutter speed is controlled by detecting the light quantity level received by the image pickup element and changing the timing of drawing the charge in the next field in accordance with the particular light quantity level.

In the case where the light quantity received by the image pickup element changes, the shutter speed is sequentially changed, field by field, to the adjacent shutter speed range in the proper direction to reach the proper shutter speed. Specifically, upon detection that the received light quantity is considerably displaced upward from the proper light quantity range, the shutter speed in the next field is changed to the speed one step higher, and the light quantity in the next field is monitored. In the case where the light quantity is displaced further upward from the proper light quantity range, the shutter speed is changed to the level one step still higher. By changing the shutter speed, step by step, for each field as described above, the proper shutter speed is soon reached with the received light quantity in the optimum range. In this way, the proper shutter speed is achieved. Upon detection that the received light quantity is displaced downward from the proper light quantity range, on the other hand, the shutter speed is changed to one step lower level to the proper exposure amount.

In a video camera with the shutter speed controlled in the way described above, the shutter speed is changed with the change in the illuminance of the object due to the panning operation (the operation of changing the angle of view in horizontal direction) and the tilting operation (the operation of changing the angle of view in vertical direction). In the case where at least the normal shutter speed (1/60 second) for the period shorter than one field is changed to the low shutter speed for the period longer than one field or the other way around during the panning operation, for example, the problem of the unseemly change between an unsmooth image and a smooth image is posed. This problem is caused by the relative speed of the object to the camera in the panning and tilting operation. Specifically, in the case where the low shutter speed is entered due to the illuminance of each object, the frame rate is reduced resulting in an unsmooth image (low speed shot), while the aforementioned problem is not posed and the image is smoothed once the high shutter speed is entered. In the camera with the shutter speed controlled automatically in accordance with the illuminance of the object, therefore, the panning operation may lead to the unseemly alternation between a smooth image and an unsmooth image. This problem is not so serious for a small panning or tilting angle with a comparatively small relative speed of the object to the camera, when the frame rate gap between high and low shutter speeds is insignificant, while the problem becomes more conspicuous with the increase in the panning or tilting angle.

The low-speed shutter technique described in JP-A-3-175885 contains no solution this problem.

In view of the problem described above, the object of this invention is to provide an image pickup device and an image pickup method in which the mixture of unsmooth and smooth images caused by controlling the shutter speed in the case where the object moves at a high rate in the image during the panning or tilting operation is suppressed thereby to produce a satisfactory image quality.

In order to achieve the object described above, according to this invention, there is provided an image pickup device and an image pickup method in which as long as the object moves at a rate smaller than a predetermined value in the image as a whole, the image is picked up by changing the shutter speed in accordance with the illuminance of the object, while in the case where the object moves at a rate not less than the predetermined value in the image as a whole, on the other hand, the image is picked up without changing the shutter speed regardless of the illuminance of the object.

Other objects, features and advantages of the invention will become apparent from the following description of the embodiments of the invention taken in conjunction with the accompanying drawings.

DESCRIPTION OF THE EMBODIMENTS

Embodiments of the invention are described below with reference to the drawings. The case for the tilting operation is not described specifically and similar to that for the panning operation.

First Embodiment

Figure 1:
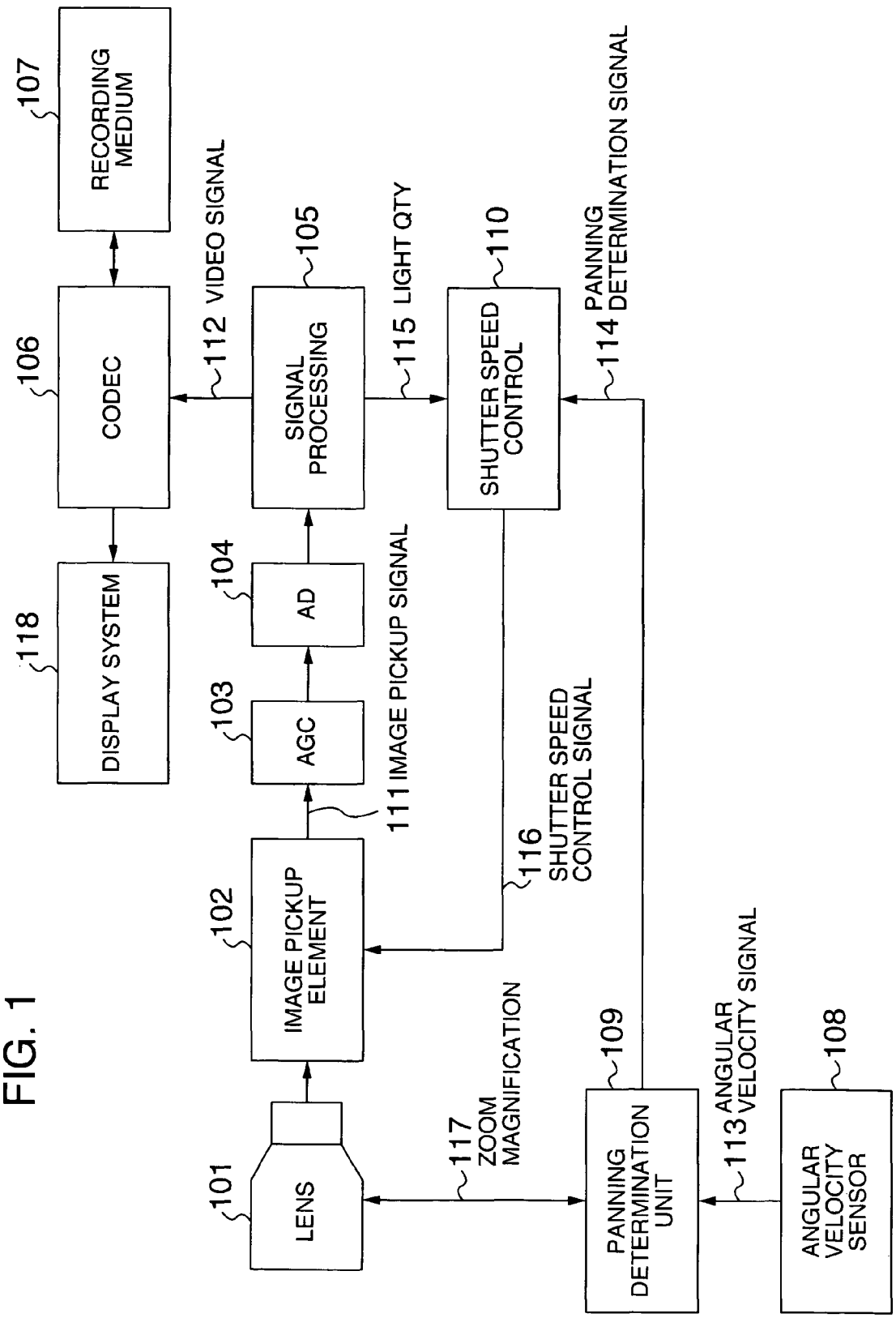
FIG. 1 is a block diagram showing a video camera implementing a first embodiment of the invention.

FIG. 1 is a block diagram showing an application of the image pickup device according to the invention to a video camera. The video camera includes a lens 101, an image pickup element 102 with a changeable shutter speed, an AGC (automatic gain control) circuit 103, an A/D (analog-to-digital) conversion circuit 104, a signal processing circuit 105, a codec (encoder/decoder) 106, a recording medium 107, an angular velocity sensor 108, a panning determination unit 109 and a shutter speed control unit 110.

Figure 2:
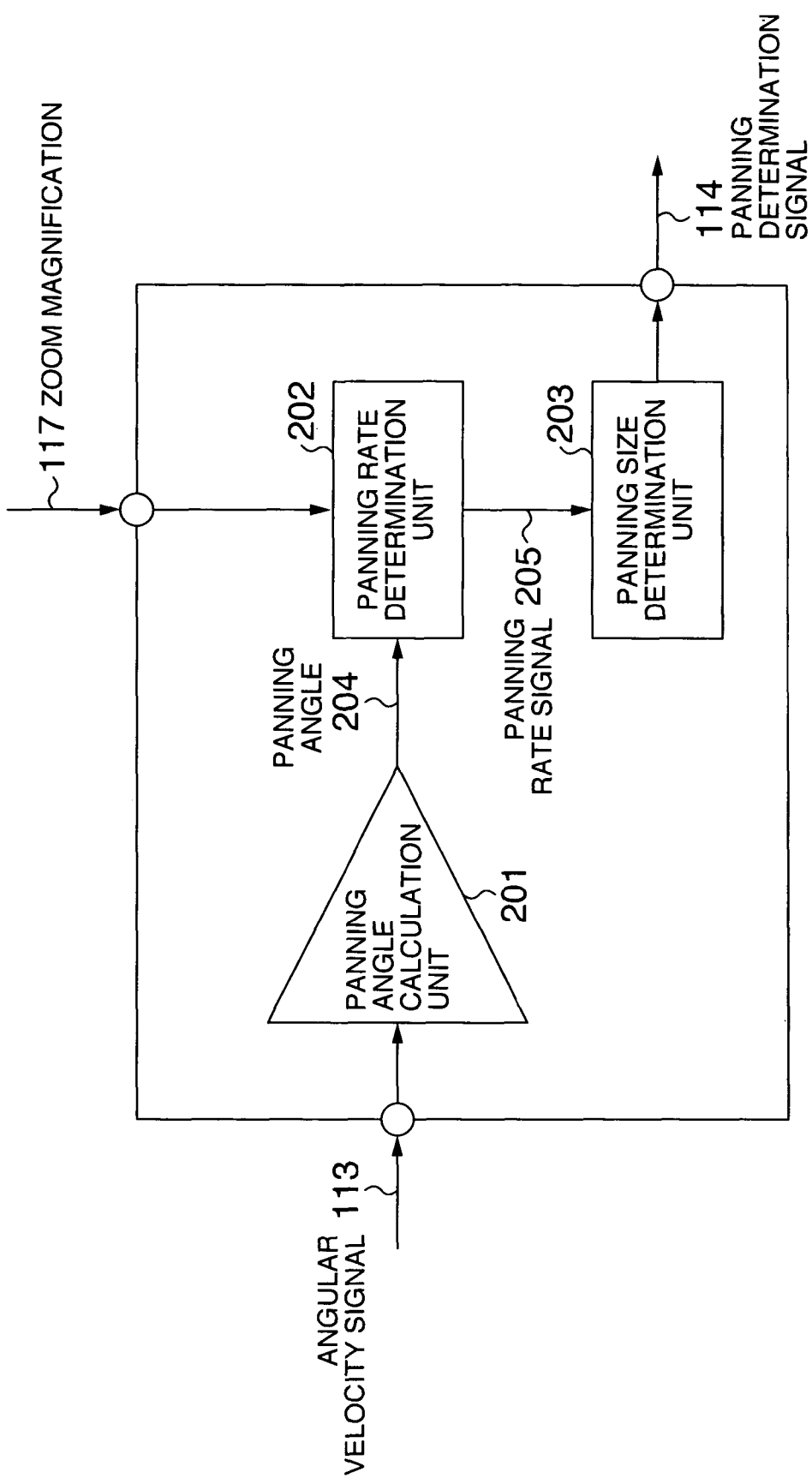
FIG. 2 is a block diagram for giving a detailed explanation of a panning determination unit 109 shown in FIG. 1.

FIG. 2 is a block diagram for explaining the panning determination unit 109 of FIG. 1 in detail. The panning determination unit 109 includes a panning angle calculation unit 201, a panning rate determination unit 202 and a panning size determination unit 203.

Figure 3A:
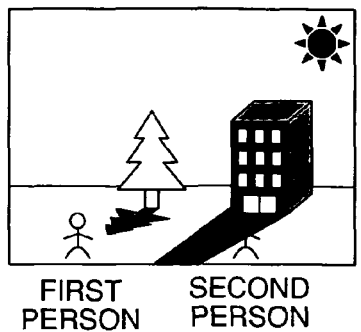
FIGS. 3A-3G are schematic diagrams showing the view of an image with the shutter speed changed and not changed during the panning operation.
Figure 3B:
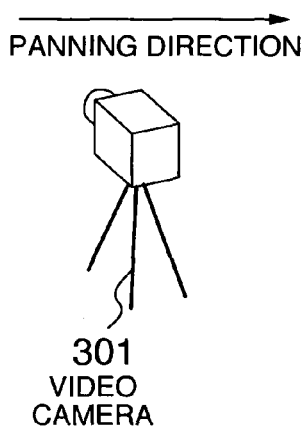
Figure 3C:
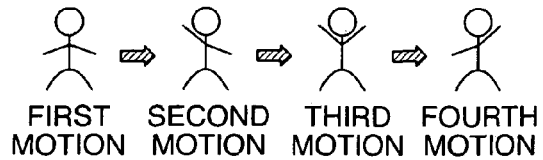
Figure 3D:
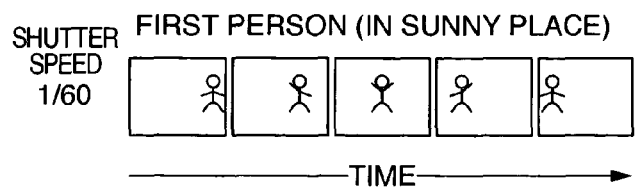
Figure 3E:
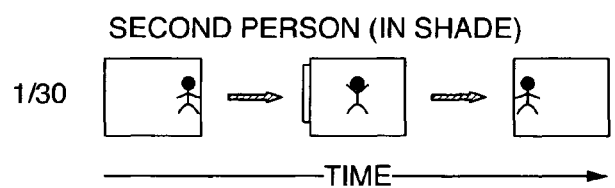

FIGS. 3A to 3G are diagrams for explaining the views of the image with the shutter speed changed and not changed during the panning operation. In FIGS. 3A-3C, first to fourth motions repeated by first and second persons are picked up as images by panning the video camera 301. The first person is located at a sunny place where the illuminance of the object is high, while the second person is located in the shade of a building where the illuminance of the object is low. In normal image pickup operation, the shutter speed is changed automatically in accordance with the illuminance of the object. Therefore, as shown in FIGS. 3D and 3E, for example, the image of the first person may be picked up at the shutter speed of 1/60, and the image of the second person may be picked up at the shutter speed of 1/30.

Figure 3F:
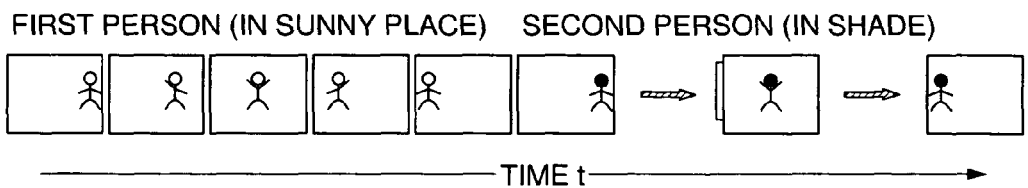

Assume the images of the first and second persons are picked by panning through them. At a high panning rate, the image as shown in FIG. 3F is picked up. Specifically, the change of the object from the first to second person changes the shutter speed, so that the image of the second person is picked up with a fewer number of frames than the image of the first person, resulting in an unsmooth image of the second person. Thus, a smooth image is changed to an unsmooth image by the transfer from the first to second person, thereby producing an unseemly image as a whole. In view of this, according to this embodiment, even in the case where the image of the second person low in illuminance is picked up as an object as shown in FIG. 3G, an unseemly image is prevented from being produced by keeping the same shutter speed while the panning rate is high.

Figure 3G:
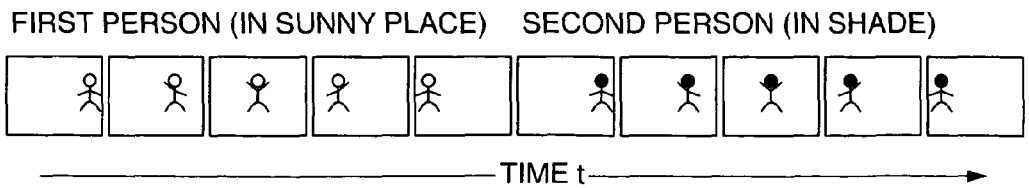

Although FIG. 3G refers to a case in which the object is changed from high to low illuminance, the invention is applicable with equal effect to a case in which the object is changed from low to high illuminance. According to this embodiment, the resulting image is less unseemly than in the case where unsmooth and smooth images are mixed, thereby leading to an improved image quality.

In the case where the panning rate is low, on the other hand, the images of the first and second persons are picked up at different frame rates. In view of the fact that the relative speed of the object is smaller than at a high panning rate, however, the boundary between smooth and unsmooth images is less conspicuous. It is preferable, therefore, not to fix but to change the shutter speed flexibly in accordance with the amount of exposure to the image pickup element.

The embodiment shown in FIG. 1, taking the aforementioned fact into consideration, is explained below.

In FIG. 1, the camera lens 101 is a focus lens or a zoom lens. In the image pickup element 102, the image of an object formed on the image pickup surface by the camera lens 101 is converted into an electrical signal by photoelectric conversion and an analog image pickup signal 111 is generated and output in accordance with this image of the object. This analog image pickup signal 111, after being amplified to a predetermined signal level by the AGC circuit 103, is converted into a digital signal by the A/D converter circuit 104 and supplied to the signal processing circuit 105. In the signal processing circuit 105, the luminance signal and the color signals are generated, and after being subjected to various signal processing including the gamma correction, output as a video signal 112 to the encoder 106. The encoder 106 generates a digital TV signal corresponding to NTSC or PAL system from the digital luminance signal and the digital color signal output from the signal processing circuit 105. The D/A converter circuit 107 converts the digital TV signal into a standard TV signal in analog form.

According to this embodiment, the angular velocity sensor 108 is used for panning size detection to output a displacement signal 113 corresponding to the panning size. The displacement signal 113 is obtained as an analog data, and converted into a digital signal of 8 bits, for example, by an A/D converter built in the angular velocity sensor 108 and input to the panning determination unit 109.

In the panning determination unit 109, as shown in FIG. 2, the panning angle calculation unit 201 first calculates the panning angle using the displacement signal 113 from the angular velocity sensor 108. The panning rate determination unit 202 determines the panning rate from the panning angle 204 and the zoom magnification 117 of the lens 101, and outputs a panning rate signal 205 to the panning size determination unit 203. The panning size determination unit 203, upon determination that the panning rate is high from the panning determination signal 205, observes the duration thereof, determines the panning size from the particular duration, and outputs the panning determination signal 114 to the shutter speed control unit 110. The shutter speed control unit 110 monitors the light quantity 115 and the panning determination signal 114 to change the shutter speed.

Figure 4:
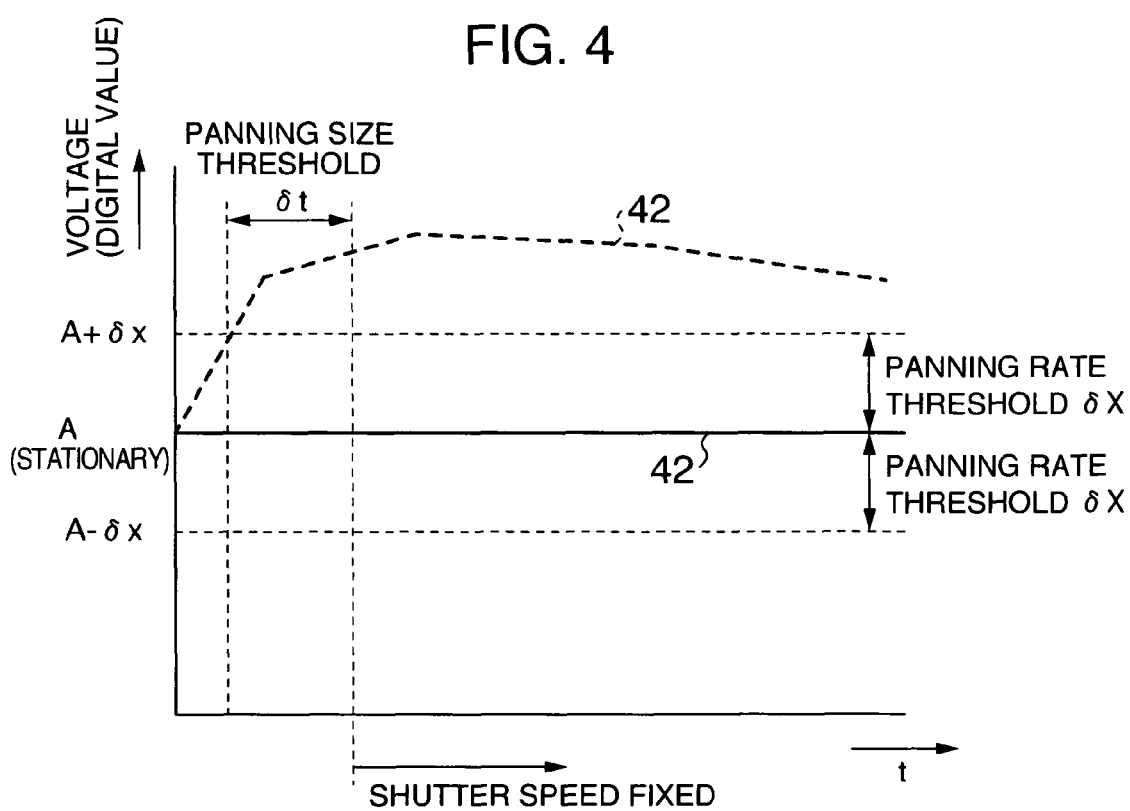
FIG. 4 is a diagram showing the manner in which the characteristic and the threshold value of an angular velocity sensor are determined.

Next, the operation of controlling the shutter speed of the camera in operation is explained with reference to FIGS. 4 to 6. FIG. 4 is a diagram showing the output characteristic (voltage value) of the angular velocity sensor for detecting the camera displacement, FIG. 5 a diagram showing the change in the electrical signal of the object image which is caused by the camera displacement during the image pickup operation, and FIG. 6 a flowchart for explaining the shutter speed control operation during the image pickup process.

FIG. 4 is a diagram showing the output characteristic of the angular speed sensor for detecting the camera displacement and represents the change in the displacement signal 113 (voltage value) of the angular velocity sensor 108 with time. Normally, the angular velocity sensor 108 has a predetermined offset output value A as indicated by solid line 41 while the camera is stationary. Once the camera is displaced and the forward or reverse acceleration is applied to the sensor, the output value is changed away from the central value as indicated by dotted line 42. The size and rate of panning during the image pickup operation, therefore, can be easily determined by monitoring the displacement signal 113 of the sensor. In the panning determination unit 109, a predetermined threshold value is set for this characteristic to determine the panning rate and size. The panning rate is determined from the output (ordinate) of the angular velocity sensor, and the threshold value is set to a predetermined value such as a panning rate threshold value $\delta X$ in FIG. 4. The panning size, on the other hand, is determined from the time during which the output of the angular velocity sensor exceeds the panning rate threshold value $\delta X$, and the panning size is determined as large in the case where the particular time lasts longer than a predetermined panning size threshold value $\delta t$.

In order for the panning determination unit 109 to determine whether the displacement signal 113 detected by the angular velocity sensor 108 is higher or lower than the threshold value, the displacement signal 113 is converted into a panning angle by the panning angle calculation unit 201, and the image pickup signal change amount is determined using the calculated angle and the zoom magnification 112 by the panning rate and size determination unit 202. The image pickup signal change amount is defined as an amount indicating the degree to which the image pickup signal is changed by the input displacement signal 113, and the threshold value of the speed of the displacement signal 113 is determined by the limit of the change amount permitted. A specific example of the method of setting this threshold value is explained with reference to FIG. 5.

Figure 5:
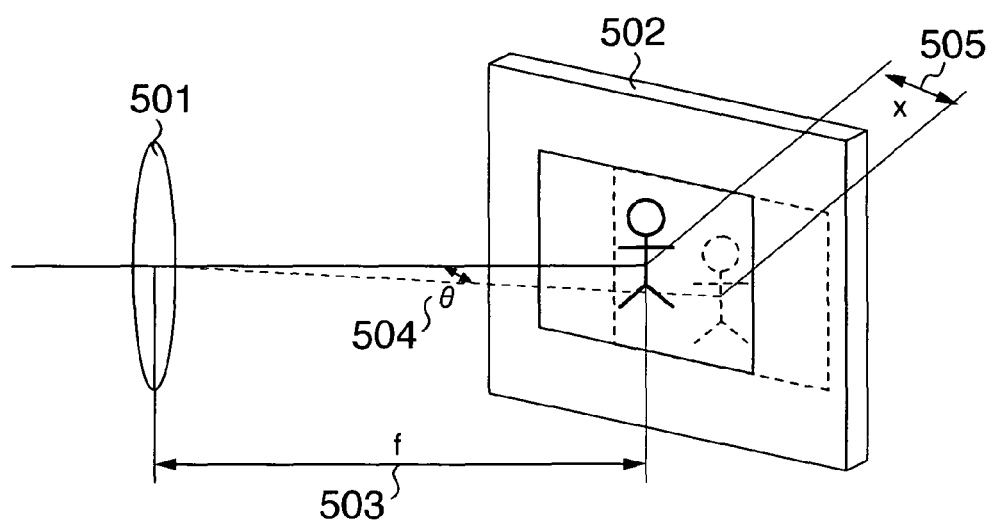
FIG. 5 shows the change in the image pickup signal applied from the lens to the image pickup element during the panning operation.
Figure 6:
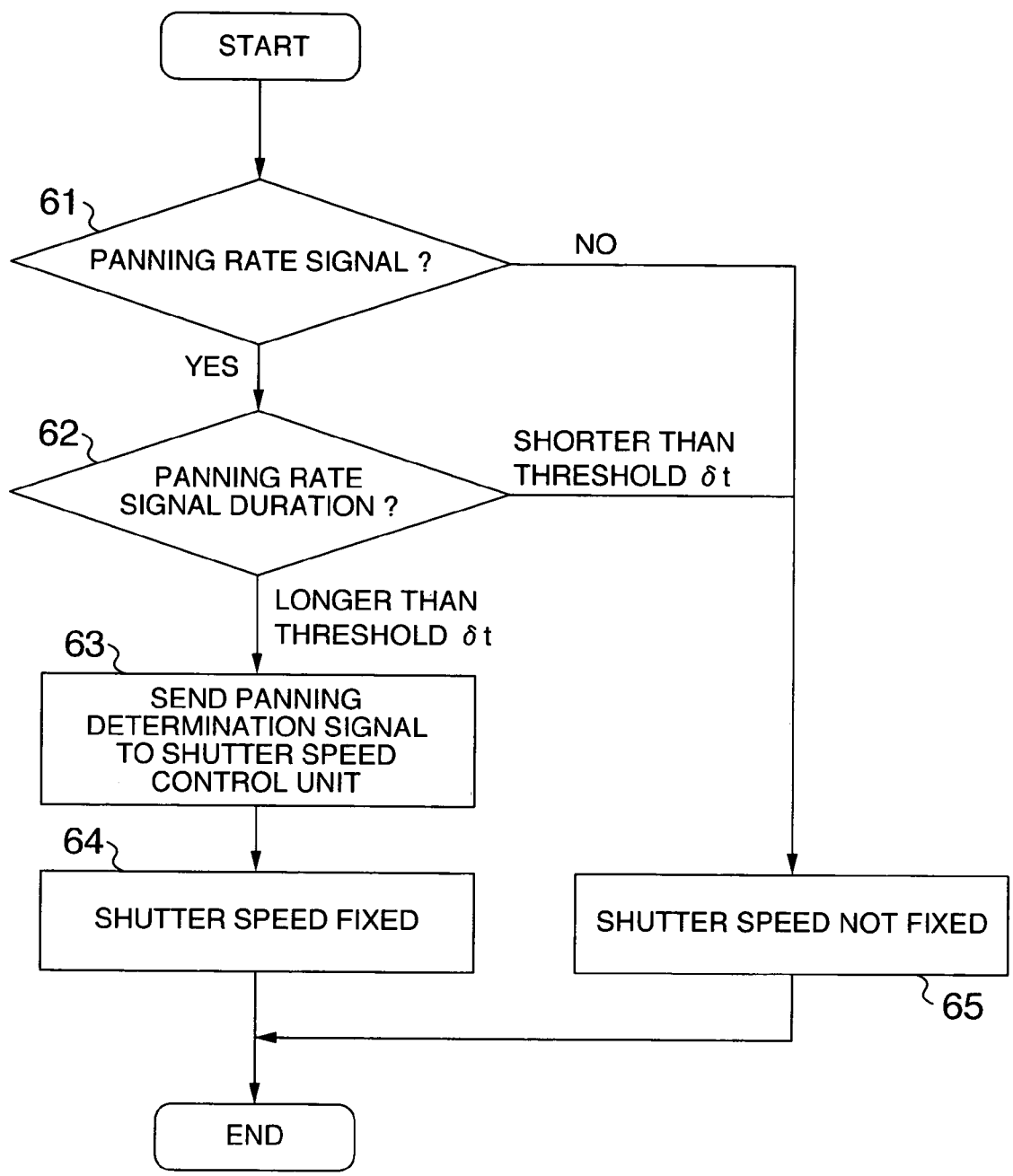
FIG. 6 is a flowchart showing a series of the process for controlling the shutter speed.

FIG. 5 shows the change in the electrical signal of the object image introduced into the image pickup element 502 from the lens 501 during the panning operation. Numeral 501 designates a zoom lens, numeral 502 an image pickup element (CCD), numeral 503 a focal length f, numeral 504 a panning angle amount $\theta$, and numeral 505 an image pickup signal change amount y. First, the panning angle amount $\theta$ is apparent from FIG. 5 and expressed by the following equation using the focal length (angle of view) f and the image signal change amount y.

$$\theta = \tan^{-1} x/f \qquad (1)$$

From equation (1), the panning angle for each image signal change amount is easily known. Once $\theta$ is known, the displacement signal 113 of the angular velocity sensor can be determined from equation (2) below.

$$V = S \cdot \theta / t \qquad (2)$$

where S is the sensitivity of the angular velocity sensor, and t the A/D sampling time.

From equation (2), the displacement signal (voltage) with a 10% change in the image pickup signal amount for the zoom magnification of unity (f=4.5 mm) is given as 372 mV in the case where the CCD size is 1/4.5 inch, the number of pixels is 1.33 million (pixel pitch size of 2.5×2.5 μm), the lens f value is 4.5 to 45 mm×10, the sensitivity of the angular velocity sensor is 20 mV/deg/s and the A/D sampling time is 1/60 sec. Assuming that the 10% image change amount is a boundary between high and low panning rates, therefore, the threshold value of the displacement signal 113 is ±372 mV, and in the case where the displacement signal 113 higher than this threshold value is input to the panning determination unit 109, the panning rate is determined as high.

Next, the panning size determination is explained. The panning size determination unit 204 has a panning time threshold value $\delta t$ as shown in FIG. 4 and determines the panning size based on the time during which the displacement signal 113 from the angular velocity sensor 108 exceeds the threshold value. In the case where this duration is longer than a predetermined time (say, one second), the panning size is determined as large, and the panning determination signal 114 is output to the shutter speed control unit 110.

Next, the shutter speed control operation to pick up an image is explained with reference to the flowchart of FIG. 6. In this case, once power for the video camera body is switched on, the camera is set in a mode for automatically controlling the shutter speed in accordance with the exposure amount for image pickup operation.

First, the panning rate determination unit 202 of the panning determination unit 109 monitors the displacement signal 113 from the angular velocity sensor 108 and determines the panning rate (step 61). In the case where the angular velocity signal 113 is smaller than a predetermined threshold value (the panning rate threshold value $\delta X$ in FIG. 4), the panning is determined as small and the shutter speed control unit 110 controls the shutter speed flexibly in accordance with the light quantity without changing the shutter speed control mode (step 65). In the case where the angular velocity signal 113 is larger than the predetermined magnitude, on the other hand, the panning rate is determined as high, and the process proceeds to the step of determining the panning size (step 62). The panning size is determined based on the time during which the high panning rate continues, and in the case where the high panning rate continues for shorter than a predetermined time, the shutter speed is controlled in accordance with the light quantity without changing the shutter speed control mode (step 65). In the case where the high panning rate continues for longer than the predetermined time (the panning size threshold value $\delta t$ in FIG. 5), on the other hand, the panning size is determined as large, and the panning determination signal 114 is output to the shutter speed control unit 110 (the process proceeds to step 63). Upon application thereto of the panning determination signal 114 from the panning determination unit 109 (in the case where the panning size and rate are larger than a predetermined value), the shutter speed control unit 110 fixes the shutter speed (step 64).

The operation described above permits the video camera image pickup device shown in FIG. 1 to control the shutter speed in accordance with the panning size and rate of the camera, and produce a more satisfactory image than the camera with a changing shutter speed.

According to this embodiment, the shutter speed is controlled while at the same time monitoring the panning size. As compared with the case where the panning size is not monitored, therefore, the determination as to whether the shutter speed is fixed or not is changed less frequently and therefore no large burden is imposed on the control operation. Nevertheless, the shutter speed may of course be controlled without monitoring the panning size. In such a case, the parameters of shutter speed control operation can be reduced.

Although the first embodiment refers to the case where the angular velocity sensor is used as a displacement detection means, the invention is not limited to this configuration and applicable widely to many displacement detection means such as for the measurement using a motion vector detection method and the detection using the accelerometer.

Second Embodiment

An embodiment using the motion vector detection method is explained below with reference to FIGS. 7 and 8.

Figure 7:
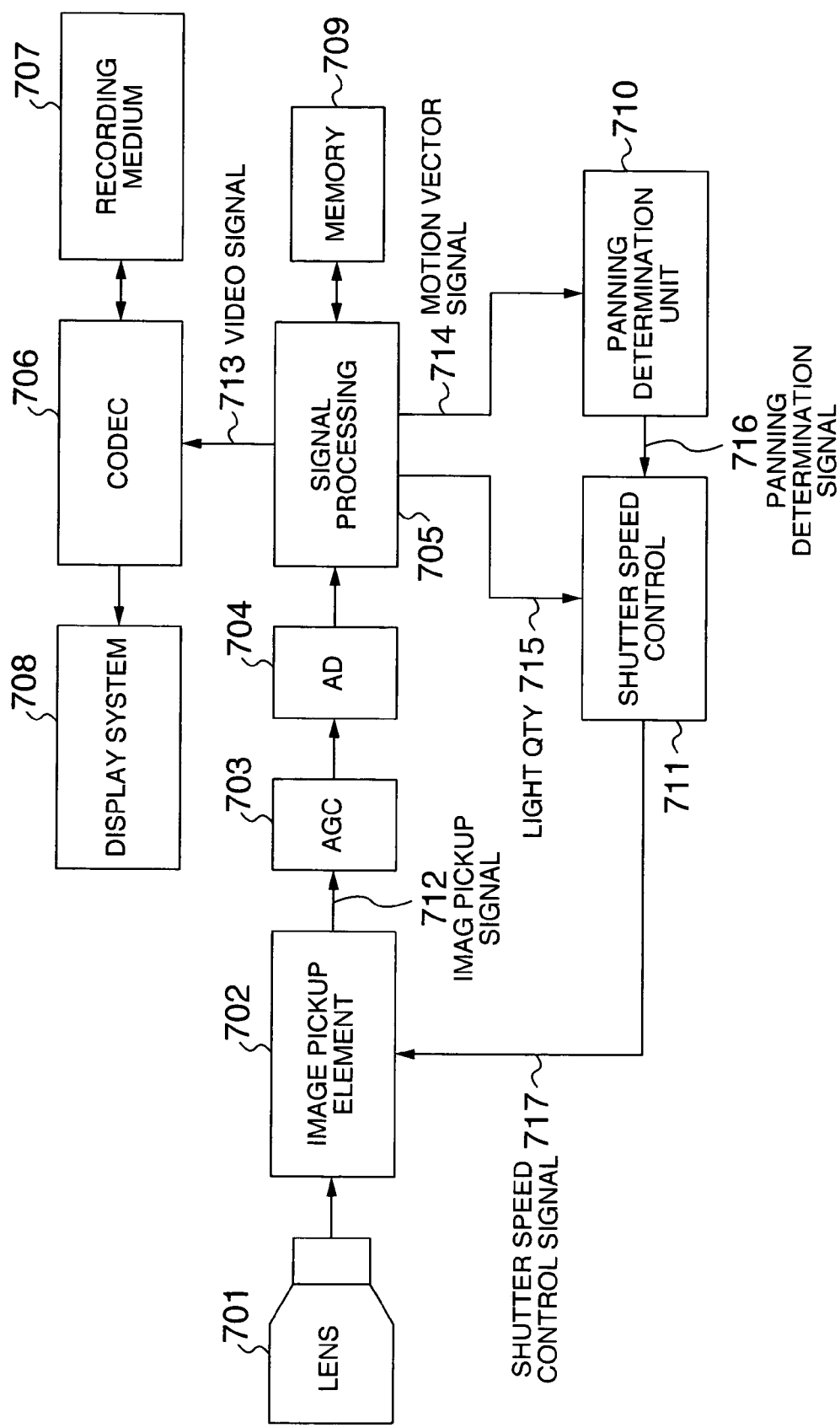
FIG. 7 is a block diagram showing a video camera implementing a second embodiment of the invention.
Figure 8:
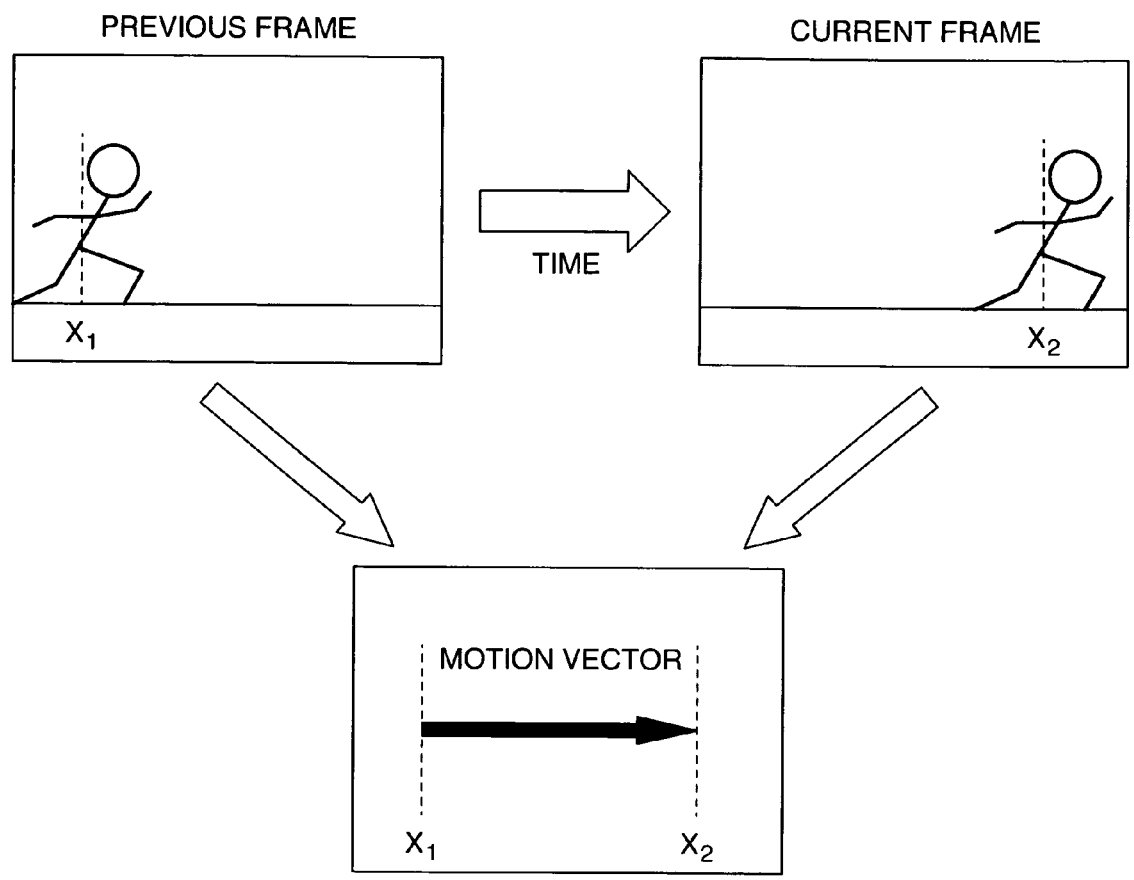
FIG. 8 is a diagram showing a method of detecting the motion vector with a memory.

FIG. 7 is a block diagram showing the operation for detecting the panning from the motion vector. In place of the angular velocity sensor 108 shown in FIG. 1, the signal processing unit includes a frame memory, and the panning detection means is changed, while the subsequent operation remains unchanged. In the signal processing unit, the video signal processed is stored in the memory, and a newly input image is compared with a previously stored image as a reference image to determine a motion amount and generate a motion vector signal. Specifically, the brightness information for a part of a given object in a previous image is stored in the memory, and whereabouts of the same brightness information in the next incoming image is detected thereby to calculate the motion vector. In the panning determination unit 710, a threshold value is set for the motion vector signal from the signal processing unit to determine whether the panning rate is high or low. In the case where the motion vector signal is larger than the threshold value, the panning determination signal is output to the shutter speed control unit. Specifically, in the case where the object moves from X1 to X2 as shown in FIG. 8, the high or low panning rate is determined according to whether the size of the motion vector changing from X1 to X2 is larger than the threshold value or not.

In the embodiments described above, it is determined whether the shutter speed is fixed or not according to the panning rate. Whether the image picked up is unsmooth or not is determined by the rate at which the object moves in the image picked up, and therefore it can of course be determined whether the shutter speed is fixed or not in accordance with the rate at which the object moves in the image. Specifically, it is determined whether the shutter speed is fixed or not in accordance with the result of detection (whether the rate at which the object moves is not less or less than a predetermined threshold value) by an object movement detection unit for detecting the rate at which the object moves in the image. In the case where the size of an image is known, on the other hand, a similar effect can be produced by detecting the amount of movement of the object without detecting the rate at which the object moves in the image. In such a case, therefore, it is determined whether the shutter speed is fixed or not in accordance with the result of detection (whether the movement amount of the object is not less or less than a predetermined threshold value) by an object movement amount detection unit.

According to the embodiments described above, a satisfactory image quality can be obtained by controlling the shutter speed in accordance with the panning or tiling rate to prevent unsmooth and smooth images from mixing with each other. Also, the shutter speed is fixed during the panning at high rate while the shutter speed is set to a value corresponding to the illuminance of the object during the panning at low rate. Therefore, the shortage or overage of exposure is prevented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image pickup method comprising the steps of:
   picking up a dynamic image by changing the shutter speed automatically in accordance with the illuminance of an object in the case where the rate at which the object moves in the whole image during a predetermined period of time is smaller than a predetermined value; and
   picking up the dynamic image without changing the shutter speed for respective frames included in the dynamic image during a predetermined period of time regardless of the illuminance of the object in the case where the rate at which the object moves in the whole image during the predetermined period of time is not smaller than the predetermined value.

2. An image pickup device comprising:
   an image pickup element for picking up an image of an object;
   a signal processing unit for generating an image from the signal output by the image pickup element; and
   an angular velocity sensor for detecting the angular velocity of the image pickup device;
   wherein, if a dynamic image is picked up, the shutter speed of the image pickup element is changed in accordance with the illuminance of the object in the case where the amount of movement detected by the angular velocity sensor is smaller than a predetermined value, and the shutter speed of the image pickup element for respective frames included in the dynamic image is not changed regardless of the illuminance of the object in the case where the movement amount detected by the angular velocity sensor is not less than the predetermined value.

3. An image pickup device comprising:
   an image pickup element for picking up an image of an object;
   a signal processing unit for generating an image from the signal output by the image pickup element; and
   a movement amount detection unit for detecting the movement amount of the image of the object;
   wherein, if a dynamic image is picked up, the shutter speed of the image pickup element is changed in accordance with the illuminance of the object in the case where the amount of movement detected by the movement amount detection unit is smaller than a predetermined value, and the shutter speed of the image pickup element for respective frames included in the dynamic image is not changed regardless of the illuminance of the object in the case where the movement amount detected by the movement amount detection unit is not less than the predetermined value.

4. An image pickup device according to claim 2, wherein the shutter speed of the image pickup element is not changed regardless of the illuminance of the object in the case where the detected movement amount continues to be not smaller than a predetermined value for not shorter than a predetermined period of time.

5. An image pickup device according to claim 3, wherein the shutter speed of the image pickup element is not changed regardless of the illuminance of the object in the case where the detected movement amount continues to be not smaller than a predetermined value for not shorter than a predetermined period of time.

\* \* \* \* \*